US012258299B2

(12) United States Patent
Prieto Gigó

(10) Patent No.: US 12,258,299 B2
(45) Date of Patent: Mar. 25, 2025

(54) PERMANENT ECO-FERTILIZER AGAINST FRUIT PHYSIOLOGICAL DISORDERS AND PESTS

(71) Applicant: S.A. Reverté Productos Minerales, Castellet I la Gornal (ES)

(72) Inventor: Arcadio Prieto Gigó, Castellet I la Gornal (ES)

(73) Assignee: S.A. Reverté Productos Minerales, Barcelona (ES)

( * ) Notice: Subject to any disclaimer, the term of this patent is extended or adjusted under 35 U.S.C. 154(b) by 896 days.

(21) Appl. No.: 17/421,621

(22) PCT Filed: Dec. 30, 2019

(86) PCT No.: PCT/EP2019/087130
§ 371 (c)(1),
(2) Date: Jul. 8, 2021

(87) PCT Pub. No.: WO2020/144076
PCT Pub. Date: Jul. 16, 2020

(65) Prior Publication Data
US 2022/0073436 A1    Mar. 10, 2022

(30) Foreign Application Priority Data
Jan. 11, 2019   (EP) .................................... 19382016

(51) Int. Cl.
*C05D 3/02*    (2006.01)
*A01N 25/02*   (2006.01)
*A01N 59/06*   (2006.01)

(52) U.S. Cl.
CPC ............... *C05D 3/02* (2013.01); *A01N 25/02* (2013.01); *A01N 59/06* (2013.01)

(58) Field of Classification Search
CPC .......... C05D 3/02; A01N 25/02; A01N 59/06; A01N 25/00; A01N 25/04; Y02P 60/21
See application file for complete search history.

(56) References Cited

U.S. PATENT DOCUMENTS 5,720,793 A    2/1998   Kato et al.
6,069,112 A    5/2000   Glenn et al.
(Continued)

FOREIGN PATENT DOCUMENTS

AU         7601491 B       11/1992
AU      2017101028 A4 *     2/2018
(Continued)

OTHER PUBLICATIONS

Rezvani, Hosein. "Surfactant-Nanoparticle Formulations at Calcite-Water and Oil-Water Interfaces for Enhanced Oil Recovery." (2023) (Year: 2023).*
(Continued)

*Primary Examiner* — Jennifer A Smith
(74) *Attorney, Agent, or Firm* — The Webb Law Firm

(57) ABSTRACT

The present invention refers to a permanent solid calcium fertilizer suitable against fruit physiological disorders and pests, characterized in that it comprises more than 98.5% weight of calcium carbonate. It is also an object of the invention the use of this fertilizer for the protection of agricultural crops against pests and preferably for the protection of pear and/or apple crops.

5 Claims, 3 Drawing Sheets

(56) References Cited

U.S. PATENT DOCUMENTS

| | | |
|---|---|---|
| 7,695,541 B1 | 4/2010 | Frizzell et al. |
| 10,398,146 B2 | 9/2019 | Sturm et al. |
| 2017/0360046 A1* | 12/2017 | Stürm .................... A01N 43/40 |

FOREIGN PATENT DOCUMENTS

| | | | | |
|---|---|---|---|---|
| DE | 10021029 A1 | 11/2001 | | |
| EP | 2447213 A1 * | 5/2012 | ............. | C01F 11/18 |
| EP | 3033944 A1 | 6/2016 | | |
| JP | H680511 A | 3/1994 | | |
| JP | H06122581 A | 5/1994 | | |
| JP | 2002530125 A | 9/2002 | | |
| JP | 201387091 A | 5/2013 | | |
| JP | 2017537956 A | 12/2017 | | |
| NZ | 280358 A | 7/1997 | | |
| WO | 9838867 A1 | 9/1998 | | |
| WO | 0032046 A3 | 6/2000 | | |
| WO | 2016096907 A1 | 6/2016 | | |

OTHER PUBLICATIONS

Yamaho. Product Catalog "New Sector Spray" Mar. 11, 2014 (Year: 2014).*

Wikipedia. "Calcium carbonate" Wikipedia: The Free Encyclopedia. Wikimedia Foundation, Inc <https://en.wikipedia.org/wiki/Calcium_carbonate> Jan. 10, 2019 (Year: 2019).*

Goss, Sandra L., et al. "Determination of calcium salt solubility with changes in pH and PCO2, simulating varying gastrointestinal environments." Journal of Pharmacy and Pharmacology 59.11 (2007): 1485-1492. (Year: 2007).*

\* cited by examiner

PERMANENT ECO-FERTILIZER AGAINST FRUIT PHYSIOLOGICAL DISORDERS AND PESTS

CROSS-REFERENCE TO RELATED APPLICATIONS

This application is the United States national phase of International Application No. PCT/EP2019/087130 filed Dec. 30, 2019, and claims priority to European Patent Application No. 19382016.4 filed Jan. 11, 2019, the disclosures of which are hereby incorporated by reference in their entirety.

FIELD OF THE INVENTION

The present invention relates to the field of chemistry and in particular to a new calcium fertilizer suitable against fruit physiological disorders and pests.

BACKGROUND OF THE INVENTION

During the last decades, chemical pesticides have played an important role in the protection of plants and control of pests. However, these chemical pesticides are known for the risks and impacts associated with their use on human health and the environment. In order to reduce these risks, a common legal framework (Directive 2009/128/EC) was established for achieving a sustainable use of pesticides. This directive minimized or prohibited the use of chemical pesticides in certain areas.

Directive 2009/128/EC encouraged the development of alternative approaches or techniques in order to reduce dependency on the use of pesticides. Therefore, it created the need for developing new natural products suitable for the control of agricultural pests, as an alternative to the synthetic pesticides that played an important role during the past decades.

In this context, the present invention refers to a new natural fertilizer having a protecting activity against crop pests. It has been surprisingly found that in addition to the control of pests, this new product has extraordinary fertilizing properties, as well as the capacity of avoiding fruit physiological disorders.

Although in recent years there has been an important increase in the development of new insecticidal treatments, up until today no effective solution has been found for a product having the capacity to protect agricultural crops against pests and, at the same time, being able to achieve a foliar nourishment of plants, including the diffusion of the nutrients across the plant.

The present invention refers to a new formulation based on calcium carbonate which has a surprising synergistic effect both as a protective agent against pests and as calcium fertilizer.

In the state of the art, different inventions have been disclosed referred to the use of calcium carbonate as a plant fertilizer and protective agent against pests.

DESCRIPTION OF RELATED ART

U.S. Pat. No. 6,069,112 discloses a method for preventing sunburn and other physiological disorders such as water-core, corking and bitterpit, without diminishing photosynthesis, comprising applying to at least a portion of a surface of a plant an effective amount of a finely divided heat treated particulate material that can comprise calcined calcium carbonate.

NZ280358 discloses a fertilizer comprising fine particles of substantially pure calcium carbonate in the form of precipitates.

AU7601491 refers to a liquid fertilizer composition comprising a deposit lime which is composed of shell, coral, etc. and which is found in cliffs, along rivers and creek beds or other places where such lime may have been deposited. The amount of calcium carbonate disclosed in the examples is of 84.30%, 83.75% or 81.8%.

DE10021029 discloses a process for preparing an agent for improving plant growth and/or for reducing pesticide residues obtained by stirring limestone powder with at least one binder and optionally other additives.

JP2013087091 refers to a controlling agent for safely and economically controlling codling moths. The controlling agent is applied to the surface of the fruits to prevent the codling moths from depositing eggs. The product comprises calcium carbonate or magnesium carbonate and a fixing agent for fixing the agent to the surface of the fruit. The average particle size of the inorganic powder is in the range of 0.1 to 3 µm.

EP3033944 discloses the use of calcium carbonate as a plant protection agent against pests during plant growth. The calcium carbonate is used in the form of particles having a particle size between 0.1 and 200 µm.

WO9838867 discloses a method for protecting surfaces from arthropod infestation which involves treating the surfaces with an effective amount of finely divided calcined kaolins, hydrophobic calcined kaolins, hydrous kaolins, hydrophobic hydrous kaolins, hydrophobic calcium carbonates, calcium carbonates or mixtures thereof.

Finallly, JPH0680511 refers to a product against insect pests comprising powdery calcium carbonate.

Based on the inventions disclosed in the state of the art, it can be concluded that even if calcium carbonate has been described as an effective fertilizer, the already known and currently available fertilizing products have different drawbacks such as their short permanence in the crops or the risks associated with their application methods. The short permanence is an important disadvantage since it implies that the composition is lost each time there are bad weather conditions such as heavy winds, dew or rain. This has important economic consequences, requiring applying the composition each time it is lost, with the consequent costs. The product object of the present invention solves this problem and avoids the need of applying the composition to the crops in multiple applications. The present invention offers the advantage that, with only one application, the composition is able to remain in the crops even after bad weather conditions.

In addition, the alternatives known in the state of the art have the disadvantage of affecting the physical appearance of the fruits, remaining as white spots after having been harvested. The present invention solves this problem, since it controls the pests affecting agricultural crops without adversely affecting the appearance of the fruits.

More in particular, the new product gives solution to the following problems:
- the permanence of the product, avoiding the need of applying it in multiple applications, and especially after bad weather conditions;
- its application does not affect the physical appearance of the fruits, avoiding any remaining residues in the form of white spots;

the fertilizing capacity, nourishing the agricultural crops whilst protecting them against pests. In particular, it is even more effective than the liquid fertilizer most commonly used (calcium chloride, $CaCl_2$)), providing calcium in a continuous way under humidity conditions. Therefore, the product object of the present invention allows reducing the number of applications required for achieving the fertilizing activity.

SUMMARY OF THE INVENTION

With the aim of giving solution to the above-identified problems and avoiding the drawbacks associated with the fertilizers known in the state of the art, the present invention refers to a new solid calcium fertilizer suitable against fruit physiological disorders and pests characterized in that it comprises more than 98.5% weight of calcium carbonate.

The main advantage of the product object of the invention is that it is an effective solid ecological fertilizer suitable for nourishing the crops with calcium at a foliar level and, in the case of fruit crops, across the cuticle of the fruits. It is also characterized by having a long permanence in the crops, due to the solid condition of the fertilizer. This is an important advantage as compared with other fertilizers of the state of the art, which achieve the fertilizing effect through the roots of the plants or trees.

It is also the object of the invention, the use of this fertilizer for the protection of crops against agricultural pests. In order to achieve this objective, the product is applied during all the stages of the agricultural cycle.

In a preferred embodiment of the invention, the fertilizer will be used in eco friendly agriculture and more preferably for the control of pests and diseases affecting pear and apple crops.

The application method is characterized in that it comprises applying between 1% and 12% weight, and more preferably between 2% and 6% weight, of the fertilizer dispersed in an aqueous suspension. In particular, the amount of calcium bioavailable in a 12% aqueous suspension of the fertilizer can range between 62 ppm and 132 ppm, and more preferably this amount can be of 92 ppm.

It has been demonstrated that the new fertilizer is able to achieve a reduction of the pests affecting the fruit trees in more than 80%.

In a preferred embodiment of the invention, the fertilizer will be used to protect pear crops against psila.

In another preferred embodiment of the invention, the fertilizer will be used to protect apple crops against carpocapsa (*Cydia pomonella*).

The main advantages of the fertilizer object of the invention are the following ones:
  its permanence, allowing a continuous fertilizing and protection action during the whole agricultural cycle. This reduces the costs associated with the treatment of the agricultural crops, reducing the number of applications required, as well as the consumption of phytochemical products;
  its positioning in the crops: it penetrates inside the leaf stomates and it is also distributed along the whole fruit epidermis. Thus, it is an effective alternative to calcium agrochemicals such as calcium chloride and allows reducing the costs associated with the amount of fertilizers and protection agents against pests required per hectare;
  the surface activity of the fertilizer particles: it allows providing calcium in a continuous way and in solid state. It also has a high ionic surface activity during humidity conditions (dew, rain) and allows increasing the calcium bioavailability at the fruit pulp; and
  it allows a dual action, both as a permanent foliar calcium fertilizer and as a protection agent against pests.

DETAILED DESCRIPTION

Figure 1:
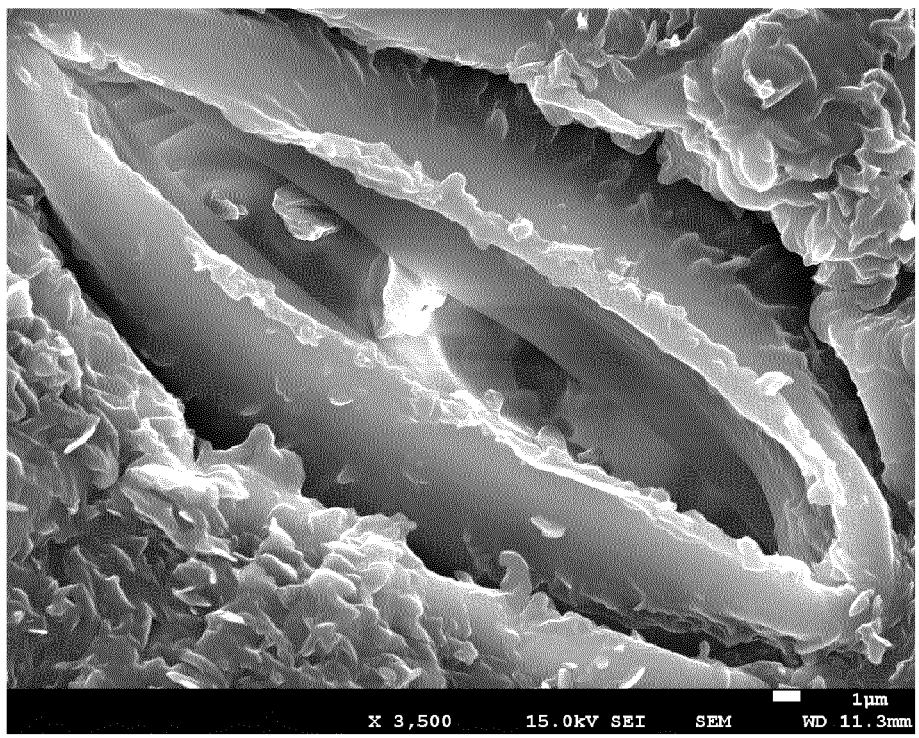
FIG. 1 shows the distribution of the fertilizer in the crops. In particular, it shows how the calcium particles are distributed inside the stomata of the leaves on which the fertilizer is applied. This is an important advantage of the fertilizer as claimed as compared with other fertilizers known in the art that, due to their size, the fertilizer cannot penetrate inside the stomates of the plant.
Figure 2:
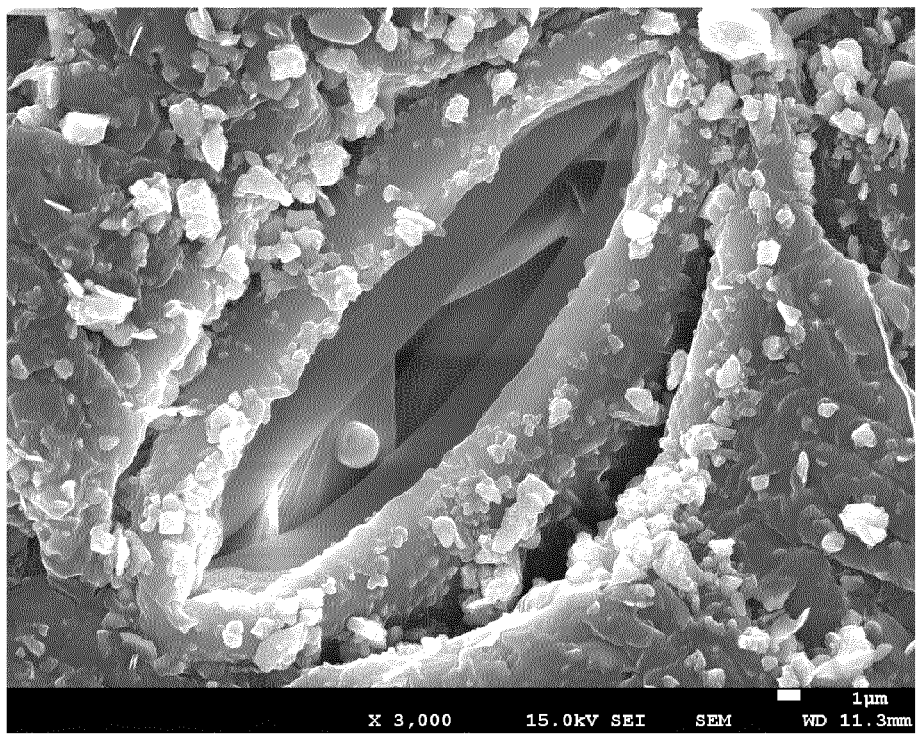
FIG. 2 shows the distribution of the calcium particles in the guard cells of the stomates of a leaf.
Figure 3:
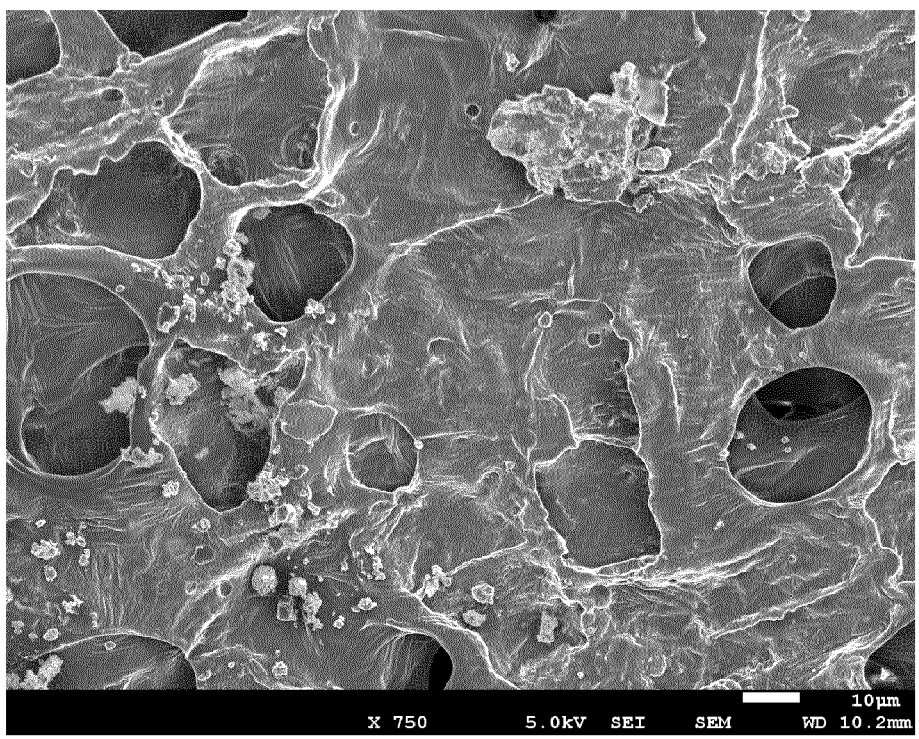
FIG. 3 shows the distribution of the calcium particles on the cuticle and the epidermis of Golden apples.
Figure 4:
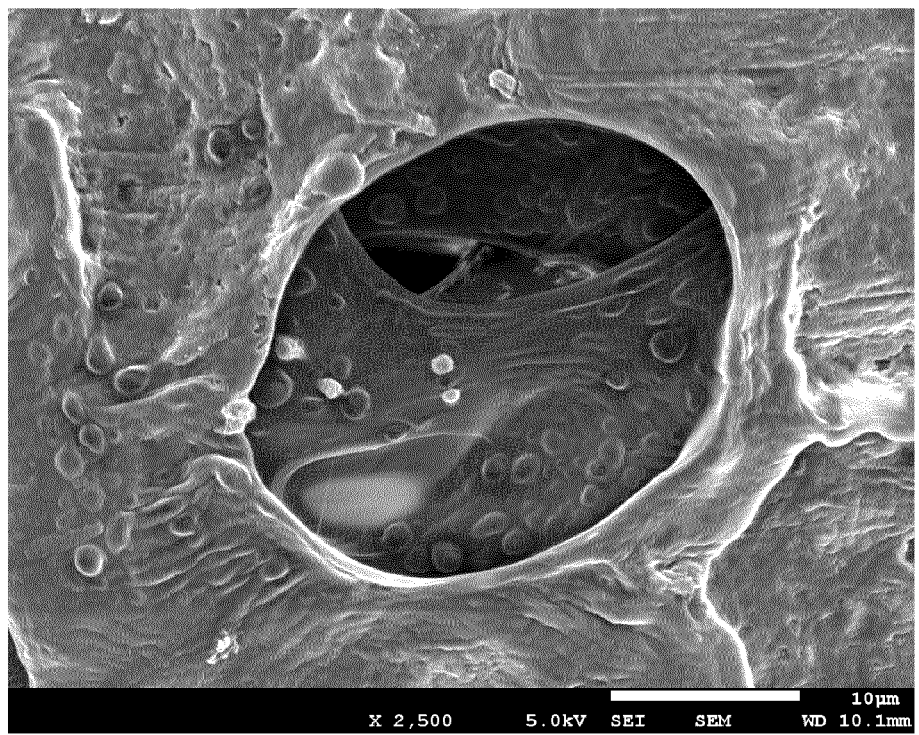
FIG. 4 is a detailed view of the calcium particles penetrating inside the epidermis of a Golden apple.
Figure 5:
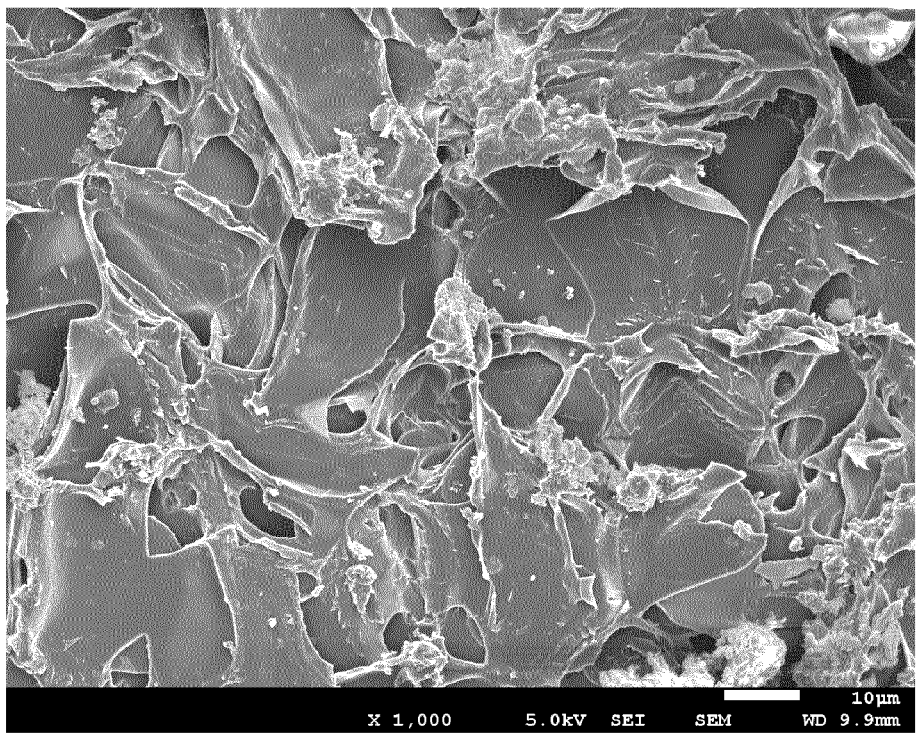
FIG. 5 shows a detailed view of the calcium particles distributed on the cuticle of a Conference pear.

One of the main advantages of the fertilizer object of the present invention, as compared to other calcium fertilizers known in the state of the art, is its high permanence in the crops under all weather conditions and during the whole agricultural cycle. Therefore, one of its main benefits is that it works as a continuous calcium pump. This avoids the need of applying calcium in multiple foliar applications as it is required when using calcium liquid fertilizers such as calcium chloride.

This advantageous effect of the new fertilizer is due to the surface chemical composition of the fertilizer, which in addition to $Ca^{2+}$ or $CO_3^{2-}$ comprises other ionic species such as $CaOH^+$, $CO_3H^-$ or $CO_3CaOH^-$ (confirmed by XPS or TOF-SIMS measurements). All of them are activated under humidity conditions (rain, dew) and allow increasing the calcium bioavailability. In particular, it has been surprisingly found that the effective amount of calcium provided by the fertilizer object of the invention is much higher than the calcium provided by other fertilizers of the sate of the art. It was indeed unexpected obtaining a surprisingly high synergistic fertilizing effect, achieving a calcium bioavailability in the range of 62 ppm to 132 ppm.

The chemical mechanisms involved in the continuous supply of calcium of the fertilizer as claimed are the following ones:
  a) firstly, the ionic species $Ca^{2+}$ and $CO_3^{2-}$ of the surface of the solid calcium compound are activated and liberated in the aqueous suspension:

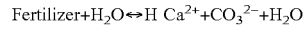

b) the liberated $CO_3^{2-}$ is then hydrolyzed and transformed into $CO_3H^-$:

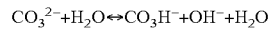

c) finally, the bicarbonate anion $CO_3H^-$ is transformed into $CO_2$ in the aqueous medium:

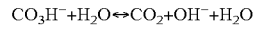

The high surface activity of the fertilizer as claimed allows obtaining a continuous supply of $Ca^{2+}$ and $CO_2$ since these ionic species are liberated under humidity conditions (rain or dew) and they are transported across the xylem of the crops until reaching the pulp of the fruits. The $CO_2$ absorption by the crops shifts the equilibrium towards a higher production of $CO_3H^-$, which at the same time is transformed into $Ca^{2+}$ and $CO_2$.

Thus, the application of the fertilizer onto the surface of the crops (stem, leaves and fruits) and the effect of the rain or dew increases the production of calcium bicarbonate, which is then broken down into $Ca^{2+}$ and $CO_2$ in the aqueous solution:

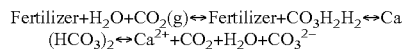

$$\text{Fertilizer}+H_2O+CO_2(g)\leftrightarrow\text{Fertilizer}+CO_3H_2H_2\leftrightarrow Ca(HCO_3)_2\leftrightarrow Ca^{2+}+CO_2+H_2O+CO_3^{2-}$$

It is also an object of the invention the use of the fertilizer as claimed in agricultural crops for the protection against pests. The distribution of the fertilizer on the surface of the leaves/fruits is essential for the subsequent activity as a calcium fertilizer: its deposition forming a thin monolayer structure maximizes the coverage effect of the fertilizer.

Besides, this allows increasing the contact surface area of the fertilizer particles in the tree trunks, the stem of the plants, the leaves or the fruits that are treated with the fertilizer. In this way, the permanence of the fertilizer is guaranteed under all weather conditions (rain, dew or wind).

In addition to the fertilizing activity, the fertilizer is suitable against agricultural pests. In particular, the new fertilizer protects both the trees and fruits against sunburn and pests. It has been demonstrated that the new fertilizer is able to reduce the pests affecting the trees in more than 80%. This is due to the way the fertilizer is distributed on the surface of the tree as well as to its long permanence.

Therefore, it is also an object of the invention the application of the fertilizer to agricultural crops, during the whole agricultural cycle. The deposition of the fertilizer is achieved by micro-pulverization at high pressures (preferably, between 7 bar and 10 bar) of an aqueous suspension of the fertilizer, generating a spray of micro-droplets preferably having a diameter equal to or smaller than 80 μm. The subsequent evaporation of the water contained in the particles distribute them forming a uniform layer on the surface of the fruits or leaves on which the fertilizer is applied, maximizing the covering effect of the fertilizer.

EXPERIMENTS

In order to prove the effectiveness of the product as claimed, different experiments were carried out consisting of treating pear and apple crops.

The fertilizing treatments were carried out in the last week of April, using a 6% weight suspension of the fertilizer in water (60 kg fertilizer/Ha) and pulverizing it at a pressure of 8 bar.

FIGS. 1 and 2 show the distribution of the fertilizer on the leaves. In particular, the figures show how the fertilizer is able to penetrate inside the leaf stomata (FIG. 1) or how it is distributed surrounding the stomatal pores, on the guard cells located in the leaf epidermis (FIG. 2).

FIGS. 3 to 5 show the distribution of the fertilizer on the fruits.

FIG. 3 shows how the fertilizer particles are distributed on the cuticle and the epidermis of Golden Apples.

FIG. 4 shows how some fertilizer particles penetrate inside the polygonal cells of the epidermis of Golden apples. Similar experiments were carried out using Conference pears, having a thicker cuticle than the cuticle of Golden apples. The cells of the Conference pears are not polygonal. They have a rounded shape and have a less ordered distribution than the apple cells.

FIG. 5 shows how other fertilizer particles are distributed along the whole cuticle surface of the pears, close to the cuticle pores that connect the cells with the epidermis cells of Conference pears, in a disordered multi-layer structure. Below the epidermis is the periderm and below it, the pulp, which is formed by parenchyma cells.

Under humidity conditions (dew or rain), the fertilizer can liberate more $Ca^{2+}$, which is available for the fruit and accumulates in the pulp. Thus, under humidity conditions, the fertilizer favours the supply of $Ca^{2+}$ and $CO_2$ "in situ" in the epidermis and, from epidermis to the pulp.

The experiments carried out also demonstrated a synergetic effect due to the characteristics of the fertilizer as claimed. In particular, due to the high doses of $Ca^{2+}$ fed to the fruits, the fertilizer allows reducing the physiological disorders of the fruits such as the bitter pit or the lenticel blotch pit, whilst maintaining the firmness of the fruits.

An additional advantage of the fertilizer as claimed is that it is easily removed from the fruit after having been harvested. Therefore, it does not adversely affect the physical appearance of the fruit, as compared with other well known fertilizers such as calcined kaolin.

The application of the new fertilizer can be carried out during the whole agricultural cycle and it allows both nourishing the crops with an effective amount of calcium and protecting the crops against agricultural pests. The treatments can be carried out at different moments during the agricultural cycle, depending on the weather conditions.

In a preferred embodiment of the invention, this treatment can be carried out as follows:

Dormant treatment (winter):

- Pre-harvest protection of fruit trees: First treatment in January consisting of applying a 5% (w/w) aqueous suspension of the fertilizer in an amount of 50 kg/Ha;

Spring, summer and fall treatments:

- Foliar fertilization of the fruit with Ca and $CO_2$, including fruit protection against sunburn and pests in a second treatment from the end of April until the beginning of May consisting of applying a 6% (w/w) aqueous suspension of the fertilizer in an amount of 60 kg/Ha;
- Cuticular fertilization of the fruit with Ca and $CO_2$, including fruit protection against sunburn and pests in a third treatment in June consisting of applying a 2% (w/w) aqueous suspension of the fertilizer in an amount of 20 kg/Ha and an additional application in July consisting of applying a 1% (w/w) aqueous suspension of the fertilizer in an amount of 10 kg/Ha;
- Post-harvest protection of the fruit tree against pests in a fourth treatment from October to November consisting of applying a 1% (w/w) aqueous suspension of the fertilizer in an amount of 10 kg/Ha.

Although this is a preferred embodiment, it will be possible to vary the time of the year when the fertilizer is applied to the crops, depending on the weather conditions of the location of the crops.

However, since the calcium is more easily absorbed, in a continuous way, coinciding with the fruit cell division (during the period of 6 to 8 weeks after bloom), the first foliar treatments of the pulp of the fruit are preferably carried out during this period.

Besides, there exists a strong competence between the leaves and the fruits for the calcium available in the crops. For this reason, in a preferred embodiment of the invention the new fertilizer as claimed is applied in multiple foliar applications in order for the calcium to directly penetrate inside the pulp, across the cuticle and epidermis of the plant or tree.

When the fruit, when growing, reaches a diameter of approximately 6 to 8 cm, in a preferred embodiment of the invention the process will comprise applying the fertilizer once more, at a lower concentration of 10 kg/Ha to 30 kg/Ha, to reinforce the supply of calcium (both foliar and cuticular) to the pulp of the fruit.

The fertilizer object of the invention has also the advantage of providing a fertilizing activity without the side effects associated with an increase in the salt index, which are common when applying the liquid fertilizers available in the state of the art (such as $CaCl_2$), which is the most commonly used). The new fertilizer has a low salinity, and therefore it avoids the increase in the pH of the soil associated with the use of calcium salts such as calcium chloride. Thus, whilst the "salt index" of calcium chloride is 87, the "salt index" of the new fertilizer is of 0.8. This is an important advantage, since it avoids increasing the osmotic pressure of the soil.

Experiment 1. Foliar Fertilization of the Pulp of Golden Apples

A first experiment was carried out to measure the foliar fertilization of Golden apples.

The treatment was carried out the last week of April using a 3% weight suspension of the fertilizer as claimed in water (30 kg/1000 l water/Ha). The reference treatment (blank) was 3% $CaCl_2$) solution (30 kg/1000 l water/Ha).

The fertilizer as claimed proved to be 50% more effective in the supply of calcium to the pulp as compared with the supply of calcium achieved with a $CaCl_2$) treatment.

The results of this first experiment are shown in table 1 below:

TABLE 1

| Sample | Treatment | Dry matter | Calcium |
|---|---|---|---|
| Golden apple pulp | $CaCl_2$ (30 kg/Ha) | 14.3% | 24 ppm |
| Golden apple pulp | Fertilizer as claimed (30 kg/Ha) | 15.2% | 36 ppm |

This experiment demonstrates that the new fertilizer as claimed is more effective than the most commonly used fertilizer ($CaCl_2$)). In particular, it has been demonstrated that when the fertilizer as claimed is applied at a concentration of 3% in water (30 kg fertilizer/1,000 l water/Ha) on Golden apples, the supply of calcium to the pulp is 50% higher as compared with the supply of calcium achieved with a $CaCl_2$ treatment.

Experiment 2. Foliar Fertilization of the Pulp of Conference Pears

A second experiment was carried out to measure the foliar fertilization of Conference pears.

The treatment was carried out the last week of April using a 3% weight suspension of the fertilizer in water (30 kg/1000 l water/Ha). The blank was the non-treated fruit.

As compared with the blank (the fruit without treatment), the fertilizer as claimed proved to be 24% more effective in the supply of calcium to the pulp.

The results of this second experiment are shown in table 2 below:

TABLE 2

| Sample | Treatment | Dry matter | Calcium |
|---|---|---|---|
| Conference pear pulp | No treatment | 18.4% | 76 ppm |
| Conference pear pulp | Fertilizer as claimed (30 kg/Ha) | 19.3% | 94 ppm |

Additional experiments were carried out to demonstrate the effectiveness of the fertilizer in the protection of crops against pests.

A comparison test was carried out treating pear trees against psila with the new fertilizer. The percentage of psila occupation was calculated by visual inspection of 200 tree suckers sampled from a total crop area of 1 Ha. These trees had only a 5% affection of psila, as compared with non-treated trees, which had a 45% affection of psila.

An additional comparison test was carried out treating pear trees against the green aphid with the new fertilizer. The percentage of green aphid occupation was calculated by visual inspection of 200 tree suckers sampled from a total crop area of 1 Ha. These trees were not infected, as compared with non-treated trees, which were infected in a percentage of 60%.

The invention claimed is:

1. A method for the fertilization and for the protection of agricultural crops against pests or against fruit physiological disorders, or both for the protection of agricultural crops against pests and against fruit physiological disorders comprising:
    providing a solid calcium composition comprising more than 98.5% weight of calcium carbonate,
    wherein between 1% and 12% weight of the solid calcium composition is dispersed in an aqueous suspension and applied at a foliar level, and
    wherein the surface chemical composition of the solid calcium composition comprises $Ca^{2+}$, $CO_3^{2-}$ and the following ionic species: $CaOH^+$, $CO_3H^-$ and $CO_3CaOH^-$ under humidity conditions, thereby providing a free calcium bioavailability ion concentration in the suspension in the range of 62 ppm to 132 ppm.

2. The method according to claim 1, wherein the agricultural crops are pear and/or apple crops.

3. The method according to claim 1, wherein the application of the aqueous suspension of the solid calcium composition is applied by micro-pulverization at a pressure between 7 and 10 bar, generating a spray of micro-droplets having a diameter equal to or smaller than 80 μm.

4. The method according to claim 1, wherein the aqueous suspension of the solid calcium composition is applied during the whole agricultural cycle.

5. The method according to claim 4, wherein the application comprises:
    applying a first treatment in January to the crops consisting of a 5% w/w aqueous suspension of the solid calcium composition in an amount of 50 kg/Ha;
    applying a second treatment from the end of April until the beginning of May to the crops consisting of a 6% w/w aqueous suspension of the solid calcium composition in an amount of 60 kg/Ha;
    applying a third treatment in June to the crops consisting of a 2% w/w aqueous suspension of the solid calcium composition in an amount of 20 kg/Ha and an additional application in July consisting of applying to the crops a 1% w/w aqueous suspension of the solid calcium composition in an amount of 10 kg/Ha; and applying a fourth treatment from October to November to the crops consisting of a 1% w/w aqueous suspension of the solid calcium composition in an amount of 10 kg/Ha.

\* \* \* \* \*